Jan. 16, 1934.  A. G. ZIMMERMAN  1,943,357
SOUND RECORDING APPARATUS
Filed Dec. 9, 1932
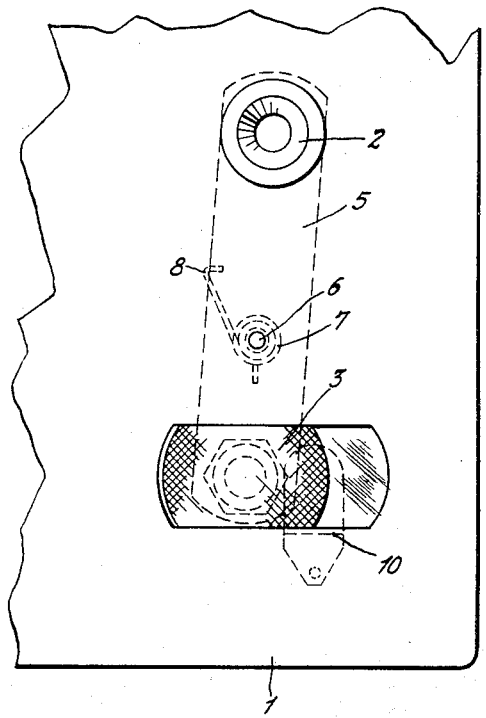
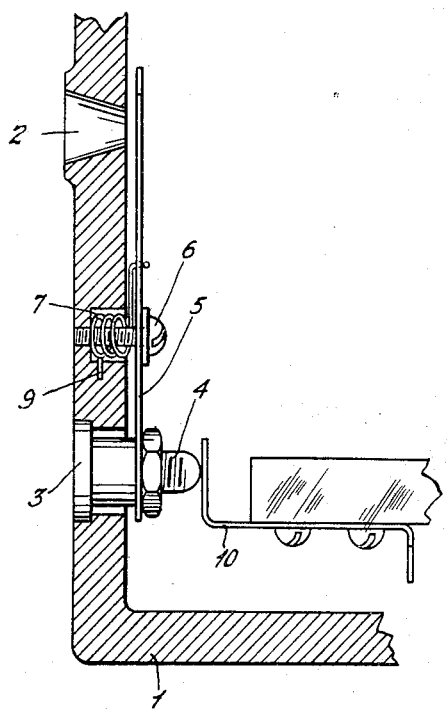
INVENTOR
ARTHUR G. ZIMMERMAN
BY
ATTORNEY Patented Jan. 16, 1934

1,943,357

UNITED STATES PATENT OFFICE 1,943,357

SOUND RECORDING APPARATUS

Arthur G. Zimmerman, Westmont, N. J., assignor to Radio Corporation of America, a corporation of Delaware Application December 9, 1932. Serial No. 646,444

6 Claims. (Cl. 179—100.3)

This invention relates to sound recording apparatus of the photographic type, and more particularly to a device for monitoring the recording light used therein.

In sound recording apparatus of the variable area type, an incandescent lamp is used to provide illumination which is shifted upon the film by a mechanical or electrical means. It is necessary that this light source be in proper adjustment and in good working order as otherwise a defective sound record would be produced, and it is therefore necessary that the lamp be inspected from time to time. If the enclosure around the lamp were provided with a permanent open peep hole or equivalent device, unnecessary light would enter therethrough and tend to fog the photographic film. Likewise if the light were left on continuously, the batteries would become rapidly run down. If the light is turned on for purposes of examination by a control switch which controls the operation of light in accordance with the film movement, then in examining the light a considerable quantity of film would be wasted.

My invention provides a peep hole for examining the light when necessary, a switch for turning the light on for purposes of examination, a cover for covering the peep hole when not in use, and means for turning off the light when the peep hole is closed.

One object of the invention is to provide an automatically closing peep hole cover in the type of apparatus discussed.

Another object of the invention is to provide an auxiliary switch for turning on the exciter lamp when it is desired to examine the same, independent of the main switch controlling the apparatus.

Another object of my invention is to provide an interconnection between the peep hole cover and the switch.

Another object of the invention is to provide means to simultaneously uncover the peep hole and turn on the light.

Another object of the invention is to provide means for automatically closing the peep hole and for turning off the light when they are not manually maintained in operation.

In the drawing:

Fig. 1 is a side view of the portion of a camera or recorder case fitted with my invention.

Fig. 2 is a vertical section through the middle of Fig. 1.

The camera or recording mechanism, or combination thereof, is enclosed in a light-tight housing 1 of which only a portion is shown. Located in the wall of this housing is a peep hole 2 preferably made in the form of a conical aperture through the wall of the camera and provided with a slightly raised edge. This aperture is of course so located that the recording light beam can be readily viewed therethrough.

In the vicinity of the peep hole is located a control knob 3 which is preferably, as shown, in the form of a small button which is set in flush with the surface of the recorder casing and which is slidable in parallelism with the said surface. This button carries, on the inner side of the casing, a contact member 4 which is adapted to cooperate with a spring contact member 10. One of these contact members is connected to the exciter lamp and the other contact member is connected to the battery, the other side of the battery being connected of course to the other side of the exciter lamp. It will be apparent that a grounded circuit may be used, i. e., with the recorder case 1, if of metal, may form a portion of the circuit and the contact 4 be electrically connected therewith by contact and through the member 5 and the screw 6.

The member 5 is a blade, preferably of metal, pivoted on the screw 6 and also pivotally connected to the members 3 and 4 so that it can move about the pivot 6 when the button 3 is slid longitudinally. This member 5 is of such width and located in such proximity to the aperture 2 that it effectively covers the said aperture and prevents the entrance of extraneous light when the member 3 is in its normal position of rest.

The pivot screw 6 has co-axial therewith a spring 7 which engages the member 5 by being hooked around the edge thereof as indicated at 8, and which is fixed at the other end to the recorder casing as indicated at 9. As shown in Fig. 1, this spring tends to rotate the member 5 in a clockwise direction and thereby retain it in the proper position to close the aperture 2. This rotation of the member 5 likewise maintains the button 3 at the lefthand extreme of its travel and maintains the contact 4 out of electrical contact with the spring 10.

When it is desired to inspect the recording light, the button 3 is (in Fig. 1) moved toward the right, and the member 5 is thereby rotated about its pivot uncovering the aperture 2 through which the lamp may be inspected and at the same time, the members 4 and 10 are brought into electrical contact, thereby completing the circuit through the exciter lamp and rendering it in condition for inspection. Upon release of the button 3, the spring 7 immediately retracts the parts to the position shown in Fig. 1.

It will be apparent that my invention is not limited specifically to its use in sound recording apparatus, but may be used for similar purposes in any apparatus where such a construction is requested.

Having described my invention, I claim:

1. Sound recording apparatus of the photographic type including a casing, an inspection aperture in the said casing, a switch mounted in the wall of said casing and adapted to close an electrical circuit for the actuation of the exciter lamp of the said apparatus, and means for obscuring the said aperture connected to the said switch whereby when the said switch is closed the said aperture will be opened.

2. Sound recording apparatus of the photographic type including a casing, an inspection aperture in the said casing, a switch mounted in the wall of said casing and adapted to close an electrical circuit for the actuation of the exciter lamp of the said apparatus, means for obscuring the said aperture connected to the said switch whereby when the said switch is closed the said aperture will be opened, and means for resiliently retaining the said switch in open position and the said obscuring means over the said aperture.

3. An inspection device for electric apparatus having a casing and an inspection aperture in the casing, comprising a slidable switch member carrying electric contact means, a pivotally mounted blade for obscuring the inspection aperture, means connecting said electrical contact means and the said blade whereby the said contact is closed when the said blade is removed from the aperture, and resilient means for returning the blade to obscuring position and opening the electric contact when the switch means is released.

4. An inspection device for photophonographic apparatus having a casing comprising a switch mounted in the wall of said casing and adapted to close an electrical switch of said apparatus, an inspection aperture in said casing, obscuring means for closing the said aperture and connected to the said switch whereby when the said switch is closed the aperture will be opened.

5. An inspection device for photophonographic apparatus having a casing comprising a switch mounted in the wall of said casing and adapted to close an electrical switch of said apparatus, an inspection aperture in said casing, obscuring means for closing the said aperture and connected to the said switch whereby when the said switch is closed the aperture will be opened, and spring means for returning the switch to open position and the obscuring means to close position.

6. Photophonographic apparatus comprising a casing having an inspection aperture therein, electrical contact means for closing a circuit of said apparatus, manual means for actuating said electrical contact means, and means connected to said manual means for operation thereby to obscure said inspection aperture.

ARTHUR G. ZIMMERMAN.